United States Patent
Kawecki et al.

(10) Patent No.: US 8,208,613 B1
(45) Date of Patent: *Jun. 26, 2012

(54) METHOD AND APPARATUS FOR CONTROLLING ROUTING OF CALLS TO PAY SERVICES

(75) Inventors: Michael Anthony Kawecki, South Bound Brook, NJ (US); Michael Anthony Scott, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/991,281

(22) Filed: Dec. 16, 1997

(51) Int. Cl.
*H04M 15/00* (2006.01)

(52) U.S. Cl. ............... 379/126; 379/114.03; 379/121.04

(58) Field of Classification Search ............ 379/114.03, 379/121.02–121.04, 126
See application file for complete search history.

(56) References Cited

U.S. PATENT DOCUMENTS

| | | | | |
|---|---|---|---|---|
| 4,191,860 A | * | 3/1980 | Weber | 379/115.01 |
| 4,538,030 A | | 8/1985 | Fossett et al. | |
| 4,924,510 A | * | 5/1990 | Le | 379/221.09 |
| 5,003,584 A | * | 3/1991 | Benyacar et al. | 379/119 |
| 5,148,474 A | | 9/1992 | Haralambopoulos et al. | |
| 5,187,710 A | | 2/1993 | Chau et al. | |
| 5,291,550 A | * | 3/1994 | Levy et al. | 379/242 |
| 5,438,570 A | | 8/1995 | Karras et al. | 370/426 |
| 5,515,425 A | * | 5/1996 | Penzias et al. | 379/114.02 |
| 5,568,541 A | | 10/1996 | Greene | |
| 5,588,048 A | * | 12/1996 | Neville | 379/127.01 |
| 5,781,620 A | | 7/1998 | Montgomery et al. | |
| 5,875,236 A | | 2/1999 | Jankowitz et al. | |
| 5,905,736 A | | 5/1999 | Ronen et al. | |
| 5,963,625 A | | 10/1999 | Kawecki et al. | |
| 5,987,327 A | * | 11/1999 | Lev et al. | 455/445 |
| 6,298,126 B1 | | 10/2001 | Kawecki et al. | |

OTHER PUBLICATIONS

U.S. Office Action dated Jun. 28, 1999 in U.S. Appl. No. 08/991,399.
U.S. Office Action dated Dec. 16, 1999 in U.S. Appl. No. 08/991,399.
U.S. Office Action dated Jul. 18, 2000 in U.S. Appl. No. 08/991,399.
U.S. Notice of Allowance dated Feb. 12, 2001 in U.S. Appl. No. 08/991,399.

\* cited by examiner

*Primary Examiner* — Simon Sing
(74) *Attorney, Agent, or Firm* — Hope Baldauff Hartman, LLC (57) ABSTRACT

A telecommunications toll network system employs a central database computer to provide routing and calling rate instructions to toll switches. To allow sponsors of pay services, such as 900 number information services, to control the kinds of calls they receive and the rates charged, the central database computer employs routing plans. These routing plans contain conditional branches selected based on data provided in a query from the originating toll switch (OTS) and sent to the database computer via common channel signaling (CCS). According to embodiments, sponsors can insert objects, called rate nodes, in their routing plans to override the default rate to be applied to the call. Rate nodes are non-branching elements inserted in a routing plan that specify a rate to be used for billing. The rate is specified on the automated message accounting (AMA) record and used by a billing platform to generate bills to the callers.

36 Claims, 5 Drawing Sheets

METHOD AND APPARATUS FOR CONTROLLING ROUTING OF CALLS TO PAY SERVICES

TECHNICAL FIELD

The invention relates generally to the field of pay telecommunications services including, for example, pay-per-product and pay-for-information services provided through 1-900 calling and, more particularly, to a method for rating calls to pay service providers.

BACKGROUND OF THE INVENTION

Pay telephone services allow customers to access different services over a telecommunications network and to pay for the services through the networks billing scheme. For example, one such service might be the provision of lottery information. A telecommunications network contains a database of information about customers, customer area codes, and other data to control routing of calls and billing of customers. Through pay telephone services, a caller can be billed a premium price for calls, typically to a 900 number, by the toll network company in a way that is similar to the way the toll network bills its customers for ordinary calls. The main difference, aside from the price of the call, is that the service provider usually receives payment through the toll network company which bills the customer through its own billing process. Service providers can also receive payment for services directly such as, for example, by credit card, through a special credit account, or by billing the customer directly.

Pay services may include pay per product services such as home shopping or catalog services and pay for information services such as government services, banking and financial services, customer services, news services, polling and surveys, fund raising, marketing and promotion opportunities, dating services, health care information services, sports score services, weather services, etc. Typically a caller dials a 1-900 telephone number and is connected through the toll network to a service bureau which connects the caller to voice machines or human beings to interact with the caller. The pay-per-product call is typically free to the user (but its cost is accounted for in the cost of the product to the consumer).

The price charged for a call can be a fixed rate per call or a fixed rate per minute of connect time. Other combinations are possible, for example, there may be a grace period during which the caller can hang up without incurring any charge. The call may run one rate for the first N incremental time periods (e.g. minutes) and another rate for each increment of time thereafter. A single call for an expensive service, for example medical advice, might be a hundred dollars or more.

Revenue losses suffered by pay service providers from such pay calls can be substantial when customers do not pay. Automatic number identification has helped to identify callers known that present a high risk of fraud. This information can be used in advance of a call. Automatic number identification provides the telephone number of the calling party (or the NPA of the originating LEC). Through a credit look-up process, the toll network provider may determine the caller's credit history, at least with respect to their toll service bill. In other words, the toll network company may verify, by looking up the calling number, callers with bad credit history. A call from a customer that is a bad credit risk can then be blocked by simply not connecting the call.

In the prior art, it is known to block calls where a bad credit card number (invalid number or bad credit history) is entered by a caller (U.S. Pat. No. 4,756,020 to Fodale). Also known is call-blocking where the ANI delivered by the local exchange carrier (LEC) is correlated with a bad credit history. Such capability is provided by Lucent Technologies' #4 Electronic Switching System (#4ESS) in communication with a database computer called a network control processor (NCP). This system also provides call-blocking in the event of a bad credit card number. A call-blocking system described in a patent to Friedes (U.S. Pat. No. 5,311,572) prompts a caller for additional information if the ANI information is insufficient to verify the identity of the caller. Another calling system that is responsive to credit information about a customer is described in U.S. Pat. No. 5,023,904 to Kaplan. A special number for dial ordering is made available by the telecommunications provider. The system checks the subscription status of callers that place orders by dialing-in product codes by looking up the ANI. The patent does not describe sharing of credit information.

The prior art solutions discussed above suffer from several drawbacks. For example, the capability for supplying the number of the calling party, a feature called automatic number identification (ANI), is not available in all areas. The availability depends on whether the LEC provides this information. Another problem for service providers results when surcharges are applied to certain calls. For example, calls in which a calling card is used to pay for the call require operator-assistance. Service providers, to insure fees to a given customer are aligned with the service provided, will attach a surcharge to such calls because they are more expensive to handle. Frequently, such surcharges cause confusion resulting in inquiry calls to the toll network company or the service provider and loss of customer goodwill. Also, operator-assisted calls cost more to handle than direct calls.

In some areas where ANI data is not available, there is no way (outside of going to a collection agency) to force a calling party to pay for 900 calls if the caller simply denies making the call. The customer's service cannot be turned off for non-payment. Such areas can be identified, for example, by a particular "problem" LEC. One solution is to have the toll network cut such LECs out. But this leads to revenue losses because paying customers are eliminated along with the problem non-paying customers. In addition, it is hard in the first instance even to identify such problem LECs. One way for a sponsor to set up a 900 number service is to have the toll network company pay the sponsor for calls before the toll network company actually receives payment from customers. In situations where the payments are never received, the toll network company must provide the sponsor with detailed information (ANI, call detail, length of call, etc.) relating uncollected receivables and collect the overpayment from the sponsor.

SUMMARY OF THE INVENTION

A telecommunications toll network system employs a central database computer to provide routing and calling rate instructions to toll switches. To allow sponsors of pay services, such as 900 number information services, to control the kinds of calls they receive and the rates charged, the central database computer employs routing plans. These routing plans contain conditional branches which are selected based on data provided in an initial query from the originating toll switch (OTS) and sent to the database computer via common channel signaling (CCS). The data transmitted in the query contains the caller's number (automatic number identification or ANI), if available (or at least the identity of the local exchange company (LEC) or area code from which the call originated) and the called number (action point number or APN). According to the invention, sponsors can insert objects in their routing plans to override the default rate to be applied to the call. These objects are called rate nodes. In addition sponsors can insert logical branches called test nodes that determine the routing of the call in response to data supplied in the query. Both the rate nodes and the test nodes allow sponsors to control rating and routing of calls without having to obtain instructions from the service provider such as by setting up communications (e.g., ISDN lines) between the toll company (either the toll switch or a central computer such as the database computer discussed above) and the service provider as in the prior art. Also, since the routes and applicable rates are determined by a program in response to a single query from the OTS, the call is handled quickly. Moreover, smaller service providers without the ability to set up communications is between their own facility (which might be simply a plain old telephone system (POTS) are able to make use of the control features provided.

According to one embodiment, the invention is a telecommunications toll switch system connecting callers with called service sponsors. A shared database computer provides information to the toll switches. The shared database computer stores routing plans defining routes connecting the callers to the service sponsors. The database computer is programmed to return instructions to toll switches in response to queries generated by toll switches in response to calls to the service sponsors. The query indicates an initial route followed by the call before reaching the toll switch. The transmitted instructions indicate a specific route for the call to be implemented by the toll switches in response to the instructions. The routing plans define alternative routes from which the specific route is extracted by the database computer in response to the routing plan and the information indicating the origin of the call arriving at the particular toll switch querying the database computer.

According to another embodiment, the invention is a telecommunications switch system connecting callers with called service sponsors. A database computer connected to an originating toll switch of the toll switches has a large central database shared by many toll switches. The database stores routing plans defining alternative routes between the callers and terminations of the service sponsors. Each of the alternative routes is determined based on at least one parameter supplied in a query receivable by the database computer from the originating switch. The originating switch is programmed to generate the query responsively to a call received by the originating switch to the one of the service sponsors. The originating switch is programmed to implement a specific route based on a parameter after receiving data from the database computer responsive to the routing plan and the query. The parameter could be any of the following:

1. data identifying a calling party number used by the caller to place the call,
2. data indicating that the call arrived at the originating switch through a human operator, and
3. data indicating that the call originated from a cellular telephone.

According to still another embodiment, the invention is a telecommunications toll switch system connecting callers with called service sponsors. The system has a database computer, in communication with multiple toll switches. The database computer has a database storing routing plans defining alternative routes that connect the callers to a termination of one of the service sponsors. Each of the alternative routes is determined based on at least one parameter supplied in a query receivable by the database computer from the originating switch. The originating switch is programmed to generate the query responsively to a call received by the originating switch from one of the callers to one of the service sponsors. The originating switch is programmed to implement a specific route determined based on the parameter after receiving data from the database computer responsive to the routing plan and the query. The parameter defines at least partly, an originating route by which the call arrived at the originating switch prior.

According to still another embodiment, the invention is a method for controlling call routing and billing by sponsors of pay-for-call services in a toll network system. The system has toll switches, a central database computer connected to the toll switches and the central database computer has a routing plan stored in the database. The method is as follows: Modify the call routing plans by insertion or deletion of an element that causes a call to be routed to a first termination when an ANI record detected by an originating one of the toll switches is incomplete. Transmit ANI data relating to a call from the originating toll switch to the central database computer. Determine specific instructions for routing the call from the routing plan modified by the step of modifying and transmitting the specific instructions to the originating toll switch. Receive at the originating toll switch the specific instructions. Route the call from the originating toll switch to the first termination, when the ANI record detected by the originating toll switch is incomplete. In the last step, the routing is not conditional at the switch, the condition is satisfied by the origin data transmitted to the database computer.

According to still another embodiment, the invention is a method for permitting control of call routing and billing by sponsors of pay-for-call services in a toll network system. According to this embodiment, the method modifies call routing plans stored on a central database computer connected to multiple toll switches. The modification is done by inserting or deleting test node elements. One type of test node elements causes the call to be routed to a first termination if an OSPS record, indicating that the call originated through an operator, is incomplete. The next step is transmitting the OSPS record from the originating toll switch to the central database computer. Next, specific instructions for routing the call are determined from the routing plan and transmitted to the originating toll switch, received at the originating one of the toll switches implemented by is the toll switch. Thus, the call will be routed to the first termination when the OSPS record detected by the originating toll switch indicates that the call originated through an operator.

According to still another embodiment, the invention is a telecommunications toll switch system connecting callers with called service sponsors. The system has database computer that is shared by many toll switches. The database computer has a database storing routing plans connecting callers with the service sponsors. The routing plans define various alternative routes, a specific route among them being implemented by the originating toll switch after a call is received by the originating switch and instructions from the database computer received. The alternative routes are modifiable by a support system computer connected to the database computer by way of a GUI program running on the support system. The GUI program is addressable through a communication through a direct modem connection via a termination or connection through the Internet. Instead of a GUI program, the support system computer could drive a telephone prompting program. To make telephone prompting easier, packaged sets of alternative routes could be predefined and selectively implemented by the sponsor over the phone. This would simplify telephone prompting. The alternative routes are defined by a conditional branch point, called a test node. Each test node has alternate branches stemming from it. Each branch corresponds to a route, the specific route chosen is connected to an outcome of the test node that satisfies a condition of the test node. The condition is determined by a parameter indicating the origin of the call. The parameter is communicated to the database computer through a query from the originating toll switch to the shared database computer.

According to still another embodiment, the invention is a telecommunications toll switch system connecting callers with called service sponsors. A shared database computer connected to many toll switches has a database storing routing plans corresponding to the service sponsors. A billing recorder connected to the toll switch, records call-duration and data indicating rates to be applied to the call. The latter data are recorded on a billing, record. The routing plans define specific routes to be implemented by the originating toll switch when a call is received by the originating switch. The specific route is one of the alternative routes. The alternative routes can end at the same destination. The alternative routes are modifiable by a support system computer connected to the database computer through a program running on it. As discussed above, the support system computer is addressable through various means. The alternative routes are defined by a conditional branch point from which stem alternate branches. The specific route corresponds to one of the alternate branches that is connected to an outcome of the test node that satisfies a condition of the test node. At least one of the alternate branches has an object, called a rate node, that forces the rate applicable to the call to be overridden when that alternate branch is connected to the outcome. Thus the billing recorder records an override rate on the billing record when the condition is satisfied. The branch point is a test node in which the condition is determined by a parameter indicating an origin of the call. The parameter is communicated to the database computer through a query from the originating toll switch to the shared database computer.

According to still another embodiment, the invention is a telecommunications switch system connected to a central database computer. The switch is programmed to generate data defining an origin of the call and transmits the data to the central database computer. The switch is also programmed to receive routing instructions from the central database computer, responsively to a transmission of the data, and to implement the routing instructions to route the call.

According to still another embodiment, the invention is a computer for controlling a plurality of telecommunications switches. The computer has a mass storage unit containing a database and at least one communication terminal connected to at least one of the telecommunications switches. The terminal is for receiving call-origin-data defining an origination route of a call to the originating telecommunications switch. The terminal is also for transmitting a selected route back to the telecommunications switch. The database defines routes through which the call may be routed to a final termination. The selected route is one of the routes defined in the database. The selected route is selected from among the routes responsively to a condition satisfiable by the call-origin-data. The computer has a programmable processor programmed to determine a selected route responsively to the condition and the call-origin-data. The programmable processor is further programmed to transmit the selected route to the telecommunications switch.

According to still another embodiment, the invention is a method for controlling a telecommunications switch connected to a central database computer, comprising the steps of: generating origin data defining an origin of the call, transmitting the origin data to the central database computer, receiving routing instructions from the central database computer, responsively to a transmission of the origin data, and implementing the routing instructions to route the call.

According to still another embodiment, the invention is a method for controlling a computer for controlling a plurality of telecommunications switches, comprising: storing, on the computer, routes through which the call may be routed to a final termination, the selected route being one of the routes, the selected route being selected from among the routes responsively to a condition satisfiable by the call-origin-data, receiving at the computer call-origin-data defining an origination route of a call to the at least one of the plurality of telecommunications switches and for transmitting a selected route back to the telecommunications switch, determining a selected route responsively to the condition and the call-origin-data, and transmitting the selected route to the telecommunications switch.

According to a feature of an embodiment of the invention, rate nodes are non-branching elements inserted in a routing plan that specify a rate to be used for billing. The rate is specified on the automated message accounting (AMA) record and used by a billing platform to generate bills to the callers. For example, a zero-rate node could be used on a time-of-day branch of a routing plan to make off-peak calls to an information service free.

According to another feature of an embodiment of the invention, test nodes are branching elements inserted in routing plans. Test nodes define branches in the routing plan which are responsive to data such as the ANI or called number. For example, a test node with one branch for calls originating from an operator and another branch for other calls, can have an enhanced rate (implemented by means of a rate node on the positive branch stemming from the test node) applied to calls from an operator. For another example, a test node testing for a call from a LEC that does not supply ANI data can cause calls from no-ANI LECs to be routed to an operator or call prompter facility to obtain additional data from the caller to assess and respond to the credit profile of the caller. The latter allows a call from a no-ANI area to be handled in a way that reduces risk from no-ANI callers, which are the source of a great deal of uncollectible receivables assumed by pay calling service providers.

DETAILED DESCRIPTION

Figure 1:
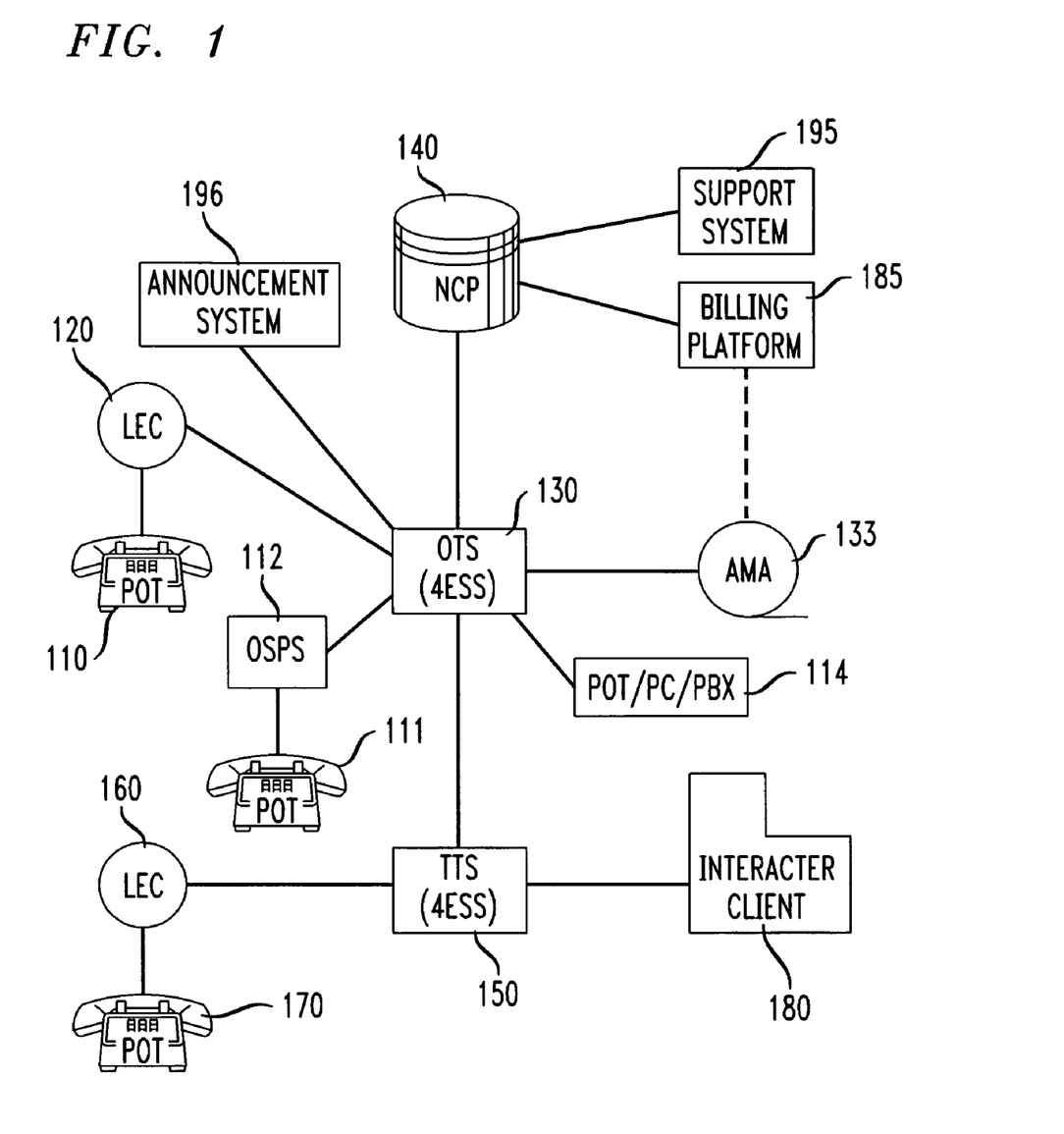
FIG. 1 shows a typical overall block diagram of a pay service call through a toll network showing a call progressing through a local exchange carrier (LEC) to a first or originating toll switch having access to a shared database.

Referring to FIG. 1, a toll-network system shown generally at 100 connects a calling party with a called service provider. A calling party initiates a call through a calling plain old telephone (POT) 110, and is connected through a local exchange carrier (LEC) 120, to an originating toll switch (OTS) 130, in the present embodiment, a Lucent Technologies' #4 Electronic Switching System (#4ESS). Alternatively, POT 111 is connected to OTS 130 with operator assistance via operator assist platform 112. Also shown connected to OTS 130 is a calling POT or computer (PC) or PBX or some other kind of calling station directly connected to OTS 130 without the need for access through an originating LEC. OTS 130 is in communication with a database computer called a network control point (NCP) 140. OTS 130 is connected to a terminating toll switch TTS 150, in the present embodiment, also a #4ESS. TTS 150 routes the call from OTS 130 to a terminating LEC 160 which connects the call to a called POT 170 of an information provider or other pay-for-call service.

Also connected to TTS 150 is an interacter client (IC) 180 which is a service type of information provider or sponsor that is connected directly to TTS 150. Interacter client 180 is capable of retrieving specialized data from TTS 150. Calling POT 110 may be a computer, cell phone, a private branch exchange (PBX), other customer premises or off-premises equipment, a personal computer connecting to the public network through the Internet, or some other telecommunications device. Called POT 170 is a pay-for-call service such as a 900 number service. The LECs may be one or more end offices or tandem offices that establish local area connections.

Alternatively, in other embodiments, the calling party is connected directly to the OTS. Also, although only two toll switches, OTS 130 and TTS 150, are shown in a real network, many toll switches may be involved in making the connection between OTS 130 and TTS 150. These toll switches may be interconnected by fiber optic channels (not shown), satellite, radio, or other communication systems.

Note that not shown in FIG. 1 are signal transfer point (STP) centers that provide for connections and may or may not be the points through which the control signal passes. STP connections are involved in communications between OTS 130 and NCP 140 and between OTS 130 and TTS 150.

NCP 140 may be connected to many toll switches other than OTS 130, as shown. NCP 140 is a shared system that contains a computer, a memory, and mass storage for data that includes: telephone numbers and credit card numbers correlated with other data to permit various responses by OTS 130, to be described below. NCP 140 is connected to a support system 195, either a separate computer that communicates with NCP 140 or functionality within NCP 140 that allows certain syntheses of data contained by NCP 140 to be made and communicated to OTS 130. OTS 130, identifying the 900 or other special number being called, transmits an initial query containing the called number, the ANI (or originating NPA is sent if the ANI is not available) and, possibly, other data. NCP 140 responds by looking in the stored data, making calculations based on sponsor-defined algorithms, and replies with billing and routing information OTS 130 will use for billing and routing the call. The latter features are discussed in more detail below.

OTS 130 is also connected to an AMA recording unit 133 which records the duration of calls and other data for billing purposes. OTS 130 is capable of blocking calls in response to special routing instructions from NCP 140.

Connected to support system 195 is a billing platform 185. Billing platform 185 is a separate computer that communicates with support system 195. Billing platform 185 calculates bills to the customer making the call from automatic message accounting (AMA) record generated by AMA recorder 133 connected to OTS 130 and from billing data from originating LEC 120. Note that the AMA record contains call billing information from NCP 140 including special rates from support system 195.

Support system 195 is either a separate computer or functionality programmed in NCP 140. Support system 195 generates code in response to user input which code is implemented by NCP 140. The user interacting with support system 195 can be either a person working for the toll company on behalf of a sponsor or a sponsor itself. Support system 195 is accessible from remote stations such as telephone modems connected to PCS or a network workstation or from a directly connected termination. Support system 195 provides a user interface to a computer program that generates code that can be run on NCP 140.

An announcement system 196 permits callers to be prompted for and respond to requests for further information such as to enter an account number, PIN, or credit card number, etc. Announcement system 196 generates synthetic voice-prompting without the need for an operator.

NCP 140 is a resource shared by many toll switches such as OTS 130 and TTS 150. Preferably more than one NCP device will be employed with redundant information to create a failsafe system. NCP 140 can be updated by sponsors accessing support system 195 either directly, such as via a secure access through the Internet, or indirectly by making requests to the toll company which makes the modifications for the sponsor. In this way, credit information required to score callers on their relative credit risk can gradually be compiled on billing platform 185 (accessed through NCP 140) and used to control routing and billing of calls.

Support system 195 is typically a computer that runs human-interface software, a graphic user interface (GUI), that generates a customer application language (CAL) is run and utilized by NCP 140. From the point of view of a user (the provisioner or person, which could be the sponsor, using the GUI), the routing plan (visible through the GUI) provides logical functions such as conditional branching, looping, and parameter tests for implementing decision trees in response to information about a call. For example, the call information, as discussed above, includes at least the ANI or the NPA, if the ANI is not supplied by the LEC 120. A sponsor may wish to have the call routing sent from NCP 140 to OTS 130 to indicate that the call should be terminated (with an announcement) if there is no ANI available.

Rate Node

Figure 2:
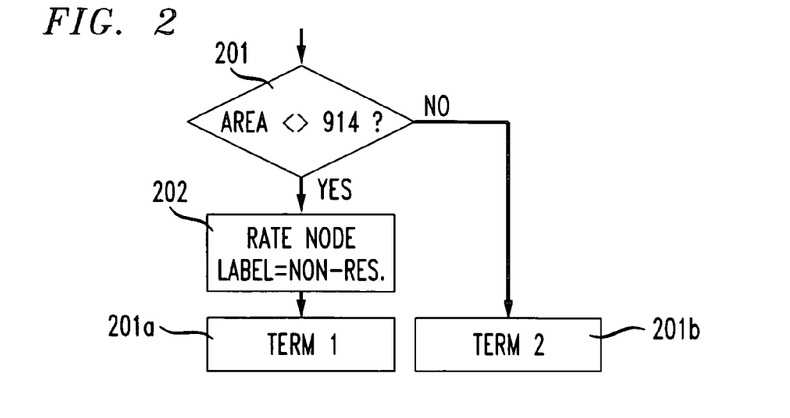
FIG. 2 shows an example of a portion of a routing plan including a rate node according to a first embodiment of the invention.
Figure 3:
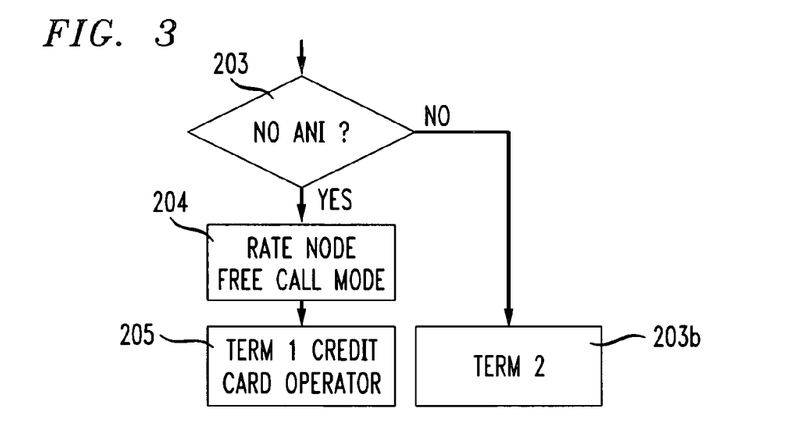
FIG. 3 shows an example of a portion of a routing plan including a rate node according to a second embodiment of the invention.
Figure 4:
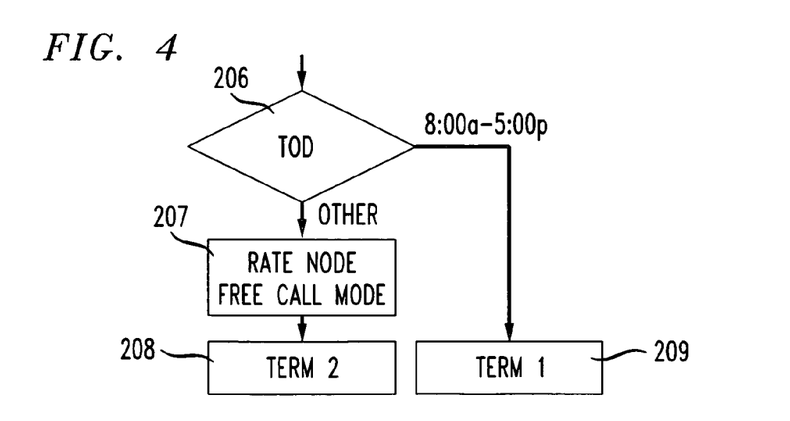
FIG. 4 shows an example of a portion of a routing plan including a rate node according to a third embodiment of the invention.

Referring to FIGS. 2, 3 and 4, examples of portions of a call routing plan for purposes of describing features and examples of application of the invention is shown. In a related application entitled Method and Apparatus for Controlling Rating of Calls to Pay Services, the entirety of which is incorporated herein by reference, a device for affecting the rate to be applied to a call, in response to a change in routing (routing here can mean a purely symbolic logical device so that a call may have alternative routes but still connected to the same destination), is described. In each plan portion, a call is routed to either a first (Term 1 201*a*) or a second (Term 2 201*b*) termination. The terminations shown and discussed are arbitrary and identified for purposes of describing the rate nodes. In FIG. 2, a geographic routing decision is made at 201 and a rate node 202 placed in the path of one outcome to apply a specified rate to the corresponding path. In the example of FIG. 2, the area code of the ANI is tested to determine if the call is from area code 914. If the call is from 914 the call is routed to termination 2 and if it is not, it is routed to termination 1. Along the termination 1-route is a rate node 202 that applies a rate for non-residences. Such a rate node application could be used, for example, to charge out-of-state callers a higher fee for information about a state lottery.

In FIG. 3, a test node 203 (described in more detail below) is used to determine whether the call is from a no-ANI LEC and if so, the call is zero-rated (no charge) by a zero-rate node 204 and then the call is routed to an operator 205 to obtain alternate form of credit. Note that additional credit information, such as a credit card number and expiration date, could be obtained through a prompter into which the caller enters digits on the numeric keypad of the calling phone.

In FIG. 4, at 206, the time of day determines the routing of the call to termination 1 209 if the time of the call is between 8:00 AM and 5:00 PM or termination 2 208 if the call is made at some other time. Along the termination 2 branch, a rate node 207 zero rates the call so that no charge is made. Other examples of rate node implementations are: Override-Rate-for-Defaults—A default branch in a decision tree determining routing of a call could have a different rate applied from that for a main branch of the decision tree. Multiple-Rate-Prompting—One type of decision-making branch implemented on NCP 140 is called a call-prompter node. This type of node is used to make decisions as to the routing of the call based on caller-entered digits. This node prompts the user, using announcement system 196 to prompt the user for voice or keyed commands. A rate node can be inserted along any branch defined by a call-prompter node so that each branch or destination would have a different rate applied to it. For example, a caller could be prompted to indicate the type of product for which he requires information and then identify the class of customer that applies (e.g., business, home, educational). Each destination could have a different rate applied to it.

Test Node

Figure 5:
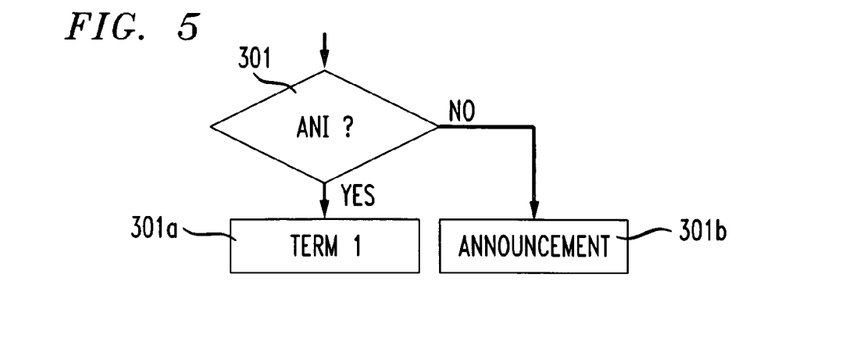
FIG. 5 shows an example of a portion of a routing plan including a test node according to a fourth embodiment of the invention.
Figure 6:
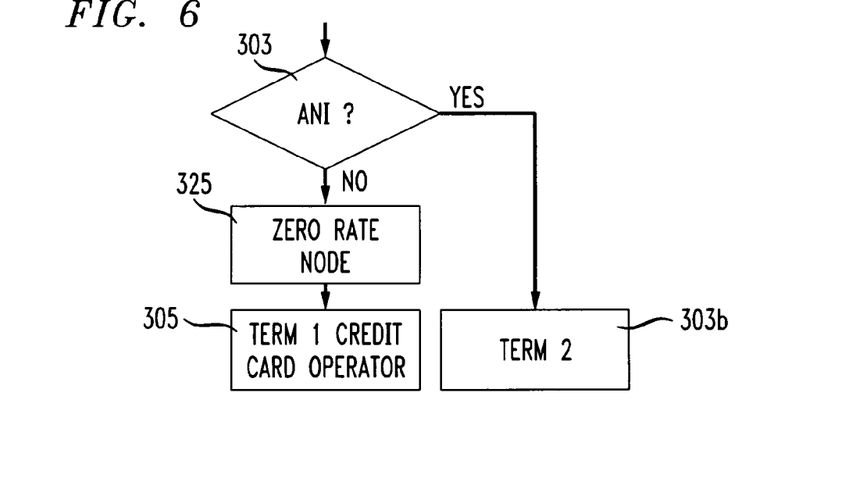
FIG. 6 shows an example of a portion of a routing plan including a test node according to a fifth embodiment of the invention.
Figure 7:
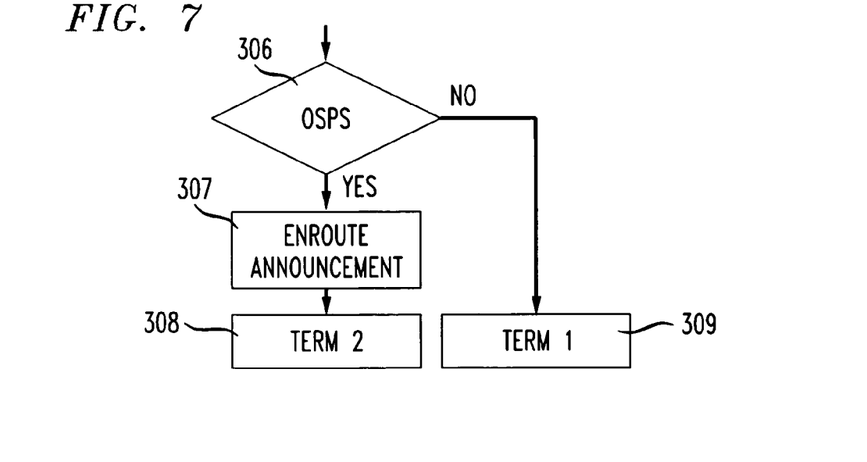
FIG. 7 shows an example of a portion of a routing plan including a test node according to a sixth embodiment of the invention.

Referring to FIGS. 5, 6, and 7, examples of test nodes are shown. A test node is an element in a call routing plan that tests for some parameter of the calling party or some other feature of the call and makes a routing decision based on the result. For example, in FIG. 5, a test node 301 tests the ANI field of the calling party to determine if the ANI is provided. If no ANI is supplied, the call is terminated with an announcement. If an ANI is supplied, the call is routed to a termination associated with the provider's service. In this example, the service provider has chosen to eliminate calls from no-ANI callers, which is useful to avoid the credit risk of such calls. In FIG. 6, an ANI test node 303 is used to route the call to an operator 305 to obtain additional credit information on the caller. The route including the operator also includes a zero-rate node 325 which zeros out the call rate to the operator so the caller is not charged twice (since the caller is paying for the call with his credit card). In this case, for example, the credit-card operator would obtain information to allow the service provider to bill the caller's credit card instead of relying on the toll company which may or may not be able to collect since the caller's ANI is not known. In FIG. 7, an OSPS test node 306 checks to determine if the call was made with operator assistance, as for example a call from originating POTS 111 through operator assist platform 112. In the example of FIG. 7, the call is routed appropriately and an announcement provided to indicate to the caller that a surcharge will be applied to the call. Another type of test node determines whether a call originated from a cell phone. Different routing could be applied when a call originates from a cell phone. For example, cell calls could be handled more expeditiously in exchange for a surcharge which could be implemented with a test node in connection with a rate node.

Note that in the above examples, although multiple terminations are shown, there is no reason that the termination could not be the same. Thus the branch for example in FIG. 7 might be just for the purpose of providing the announcement or the branching in FIG. 2 might be just for application of the different rates.

The following describes the course of a call made according to the invention:

1. A caller dials a number, for example, a pay-for-information number 1-900-NXX-XXXX.

2. Originating LEC 120 recognizes the number as one for the toll company providing 900 service to sponsors. Originating LEC 120 then routes the call to OTS 130.

3. OTS 130 receives the called number and ANI from LEC 120, generates a query containing this information, and sends the query to NCP 140.

4. NCP 140 looks up the called telephone number to determine the corresponding routing plan to implement. The routing plan contains test nodes and/or rate nodes. NCP 140 implements the plan to generate instructions for the routing and rating of the call.

5. NCP 140 transmits a message that indicates the appropriate routing and rating information back to OTS 130. This information could instruct OTS 130 to simply complete the call to the ultimate destination or to do something, such as prompt the caller to enter further information and respond to NCP 140 with the results.

6. OTS 130 sends a message to TTS 150 indicating the destination of the call.

7. The call terminates at the sponsor's site 180.

8. TTS 150 indicates to OTS 130 that the call has been picked up ("answer supervision").

9. OTS 130 begins recording the AMA record using information, including an index value corresponding to a rate to be applied, which information is supplied earlier from NCP 140. Note that the rate information could be supplied directly (dollars and cents) rather than through an index value and recorded on the AMA record.

10. The AMA record is supplied to billing platform 185. EMI data containing billing data from the LEC is also supplied to the billing platform if the call is a no-ANI call)

11. Billing platform 185 derives the special rating information from the AMA record and applies it to prepare a bill.

Figure 8:
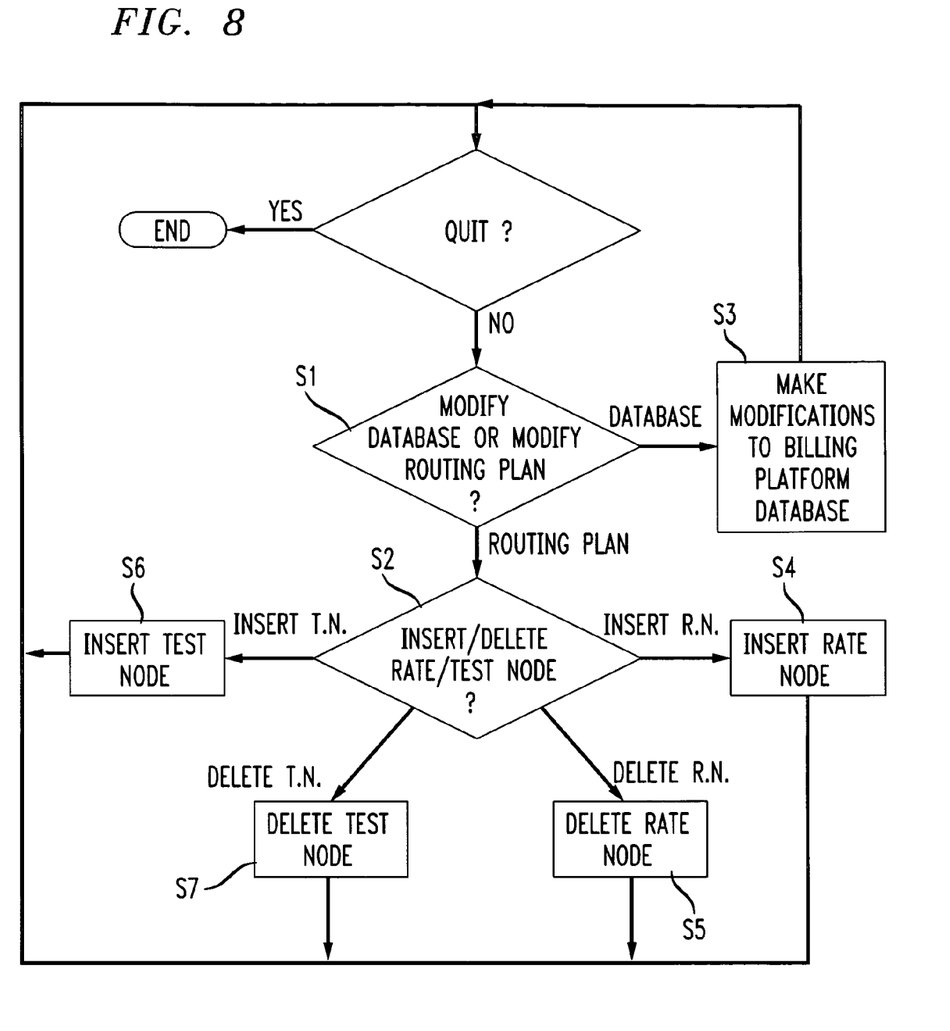
FIG. 8 shows a flow chart representing a method of allowing a sponsor to insert rate and/or test nodes into a routing plan.

Referring to FIG. 8, the following describes the logic of the GUI is used to define routing plans and credit-risk database ultimately used by NCP 140 and billing platform 185. At S1, the user (the sponsor itself or a toll-company employee running the GUI on the sponsor's behalf) is prompted to indicate whether a modification of the routing/rating plan or caller database is desired. At S2, if the user wishes to modify the routing/rating plan, the user is prompted to indicate whether the insertion or deletion of a rate node or insertion or deletion of a test node is desired. At S3, in response to an indication at step S1 that the user wishes to modify the caller database, the GUI executes a routine to allow the making of modifications to the database defining customer risk correlated with ANIs. At S4, if the user indicated that a rate node was to be inserted, the user is prompted with a list of routing branches to which a rate node can be applied. The user selects from the list, is prompted to select the type of rate and the amount if applicable and the rate node is added. At step S5, if the user indicated that a rate node was to be deleted, the user is prompted with a list of existing rate nodes showing the type of rates with the corresponding routing branches. The user selects the rate to be deleted. At step S6, if the user indicated that a test node was to be inserted, the user is prompted with a list of routing branches to which a test node can be applied. The user selects a branch and is prompted to select from a list of types of test nodes and the test node is added. Then the user is prompted to indicate the termination for the new branch of the test node. At step S7, if the user indicated that a test node was to be deleted, the user is prompted with a list of existing test nodes showing the type of test nodes. The user selects the test node to be deleted and the test node is deleted.

Note that, ideally, the GUI interface follows the format of a flow chart. Thus, FIGS. 2-7 represent the kinds of graphical objects that are preferably used in the GUI to allow updates to be made to the routing plans. Thus, in a preferred embodiment, the GUI projects flow charts onto a computer screen allowing the flow-chart elements to be manipulated, moved, deleted, modified, selected, and so as well known in the programming field to form, modify, or eliminate various features of the routing plans.

Figure 9:
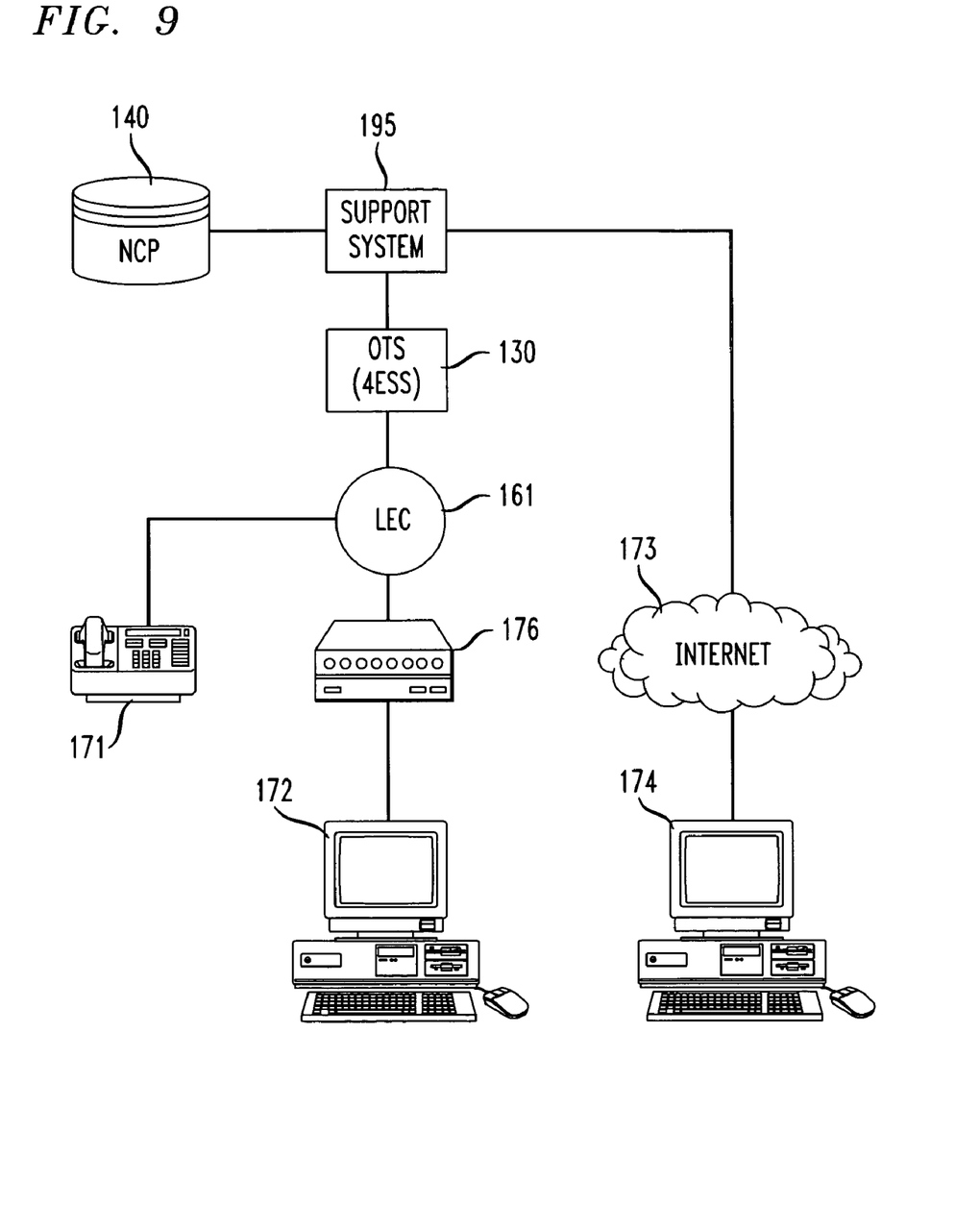
FIG. 9 shows a block diagram of devices for updating a routing plan stored on a database computer (NCP) by inserting, deleting, and modifying rate and test nodes through a support system computer.

Referring to FIG. 9, note that the modifications to the routing plans stored in NCP 140 are implemented by means a GUI running on support system computer 195. The support system 195 can be accessed by a sponsor through various means such as through touch-tone commands and voice prompting using a telephone 171. This allows even small sponsors to make customized call routing plans. Alternatively, the GUI can be accessed by means of a secure Internet connection 173 through a termination 174. Still another means of accessing the GUI is through a direct dial-up service using a modem 176 and a PC 172.

Note that a menu of predefined routing plans could be stored on support system 195 which would make updating of routing plans more amenable to voice-prompting through telephone 171 as well as the other methods described with reference to FIG. 9. Predefined plans could be defined by the toll company as recommended plans or defined by the sponsor and stored for later selective implementation. Such a scenario would be more amenable to voice-prompting.

We claim:

1. A telecommunications toll switch system connecting callers with called service sponsors, the telecommunications toll switch system comprising:
    toll switches forming a network;
    a shared database computer connected to a toll switch of the toll switches, the shared database computer having a database storing routing plans defining routes connecting the callers to a called service sponsor of the called service sponsors;
    the shared database computer being programmed to return instructions to the toll switch in response to a query from the toll switch, the query being generated by the toll switch in response to a call from a caller of the callers to the called service sponsor, the query indicating initial route information followed by the call before reaching the toll switch, the instructions indicating a specific route for the call to be implemented by the toll switch in response to the instructions, the initial route information providing an indication of a route followed by the call from the caller to the toll switch, and a routing plan of the routing plans defining alternative routes from which the specific route is selected by the shared database computer in response to the routing plan and the initial route information; and
    an announcement system connected to the toll switch, the announcement system having a recording indicating that a specified rate is to be applied to the call,
        the routing plan being such that the specific route is a first route when the initial route information includes an indication that the call was operator-assisted, and
        the first route being such that the announcement system is controlled to play the recording when the specific route is the first route.

2. The system of claim 1, wherein the routing plan is such that the specific route is a second route when the initial route information includes an indication that the call originated from a cellular phone.

3. The system of claim 1, wherein the routing plan is such that the specific route is a third route when the initial route information lacks an identification of the caller.

4. The system of claim 3, further comprising a support system computer connected to the shared database computer and programmed to update the routing plans in response to input data directly entered by the called service sponsors.

5. The system of claim 1, wherein:
    the routing plan is such that the specific route is a third route when the initial route information lacks an identification of the caller; and
    the third route includes an operator for obtaining credit information from the caller.

6. The system of claim 1, wherein the routing plan is such that the specific route is a fourth route when the initial route information includes an indication that the call originated from one of a specified local exchange carrier and a specified area code.

7. The system of claim 6, further comprising a support system computer connected to the shared database computer and programmed to update the routing plans in response to input data directly entered by the called service sponsors.

8. The system of claim 1, further comprising a support system computer connected to the shared database computer and programmed to update the routing plans in response to input data directly entered by the called service sponsors.

9. The system of claim 1, wherein:
    the routing plan is such that the specific route is a third route when the initial route information lacks an identification of the caller; and
    the third route is such that the announcement system is controlled to play the recording when the specific route is the third route.

10. A telecommunications toll switch system connecting callers with called service sponsors, the telecommunications toll switch system comprising:
    toll switches forming a network;
    a shared database computer connected to a toll switch of the toll switches, the shared database computer having a database storing routing plans defining routes connecting the callers to a called service sponsor of the called service sponsors;
    the shared database computer being programmed to return instructions to the toll switch in response to a query from the toll switch, the query being generated by the toll switch in response to a call from a caller of the callers to the called service sponsor, the query indicating initial route information followed by the call before reaching the toll switch, the instructions indicating a specific route for the call to be implemented by the toll switch in response to the instructions, the initial route information providing an indication of a route followed by the call from the caller to the toll switch, and a routing plan of the routing plans defining alternative routes from which the specific route is selected by the shared database computer in response to the routing plan and the initial route information; and an announcement system connected to the toll switch, the announcement system having a recording indicating that a specified rate is to be applied to the call;

the routing plan is such that the specific route is a third route when the initial route information lacks an identification of the caller; and the third route is such that the announcement system is controlled to play the recording when the specific route is the third route.

11. A telecommunications toll switch system connecting callers with called service sponsors, the telecommunications toll switch system comprising:

a network having toll switches;

a database computer connected to an originating toll switch of the toll switches; and the database computer having a database storing routing plans defining alternative routes that connect the callers to a termination of a called service sponsor of the called service sponsors;

each of the alternative routes being determined based on a parameter supplied in a query receivable by the database computer from the originating toll switch;

the originating toll switch being programmed to generate the query responsively to a call received by the originating toll switch from a caller of the callers to the called service sponsor;

the originating toll switch being programmed to implement a specific route determined based on the parameter after receiving data from the database computer responsive to a routing plan of the routing plans and the query;

the parameter being one of data identifying a calling party number used by the caller to place the call, data indicating that the call arrived at the originating toll switch through a human operator, and data indicating that the call originated from a cellular telephone; and an announcement system connected to a toll switch of the toll switches, the announcement system having a recording indicating that a specified rate is to be applied to the call, the parameter is data indicating whether the call arrived at the originating toll switch through a human operator and the routing plan being defined such that the specific route is a first route when the parameter indicates the call arrived through a human operator, and the first route being such that the announcement system is controlled to play the recording when the specific route is the first route.

12. The system of claim 11, wherein the parameter is data indicating that the call originated from a cellular telephone.

13. The system of claim 11, wherein the parameter is data identifying a calling party number used by the caller to place the call.

14. The system of claim 11, further comprising:

a support system computer connected to the database computer and programmed to update the routing plans in response to input data directly entered by the called service sponsors;

the support system computer being programmed to represent the routing plans as a graphical object with each of the alternative routes corresponding to a branch-shaped portion of the graphical object.

15. The system of claim 11, wherein:

the parameter is data incompletely identifying a calling party number used by the caller to place the call;

the routing plan being defined such that the specific route is a third route when the data incompletely identifies the calling party number; and the third route directs the call to a human operator.

16. The system of claim 11, wherein the parameter is data incompletely identifying a calling party number used by the caller to place the call.

17. The system of claim 11, wherein:

the parameter is data incompletely identifying the calling party number used by the caller to place the call;

the routing plan being defined such that the specific route is a third route when the data incompletely identifies the calling party number; and the routing plan being defined such when the specific route is the third route, the announcement system is controlled to play the recording when the specific route is the third route.

18. A telecommunications toll switch system connecting callers with called service sponsors, the telecommunications toll switch system comprising:

a network having toll switches;

a database computer connected to an originating toll switch of the toll switches; and the database computer having a database storing routing plans defining alternative routes that connect the callers to a termination of a called service sponsor of the called service sponsors;

each of the alternative routes being determined based on a parameter supplied in a query receivable by the database computer from the originating toll switch;

the originating toll switch being programmed to generate the query responsively to a call received by the originating toll switch from a caller of the callers to the called service sponsor;

the originating toll switch being programmed to implement a specific route determined based on the parameter after receiving data from the database computer responsive to a routing plan of the routing plans and the query;

the parameter being one of data identifying a calling party number used by the caller to place the call, data indicating that the call arrived at the originating toll switch through a human operator, and data indicating that the call originated from a cellular telephone; and an announcement system connected to said at least one of said toll switches a toll switch of the toll switches, the announcement system having a recording indicating that a specified rate is to be applied to the call the parameter being data incompletely identifying a calling party number used by said caller to place the call, the routing plan being defined such that the specific route is a third route when the data incompletely identifies the calling party number, and the routing plan being defined such when the specific route is the third route, the announcement system is controlled to play the recording when the specific route is the third route.

19. A method for permitting control of call routing and billing by sponsors of pay-for-call services in a toll network system having toll switches, a central database computer connected to the toll switches having a routing plan stored therein, the method comprising:

modifying the routing plan by insertion or deletion of an element that causes a call to be routed to a first termination when an automatic number identification record detected by an originating toll switch of the toll switches is incomplete;

transmitting automatic number identification data relating to the call from the originating toll switch to the central database computer;

determining specific instructions for routing the call from the routing plan modified and transmitting the specific instructions to the originating toll switch; and receiving at the originating toll switch specific instructions and routing the call from the originating toll switch to the first termination when the automatic number identification record detected by the originating toll switch is incomplete.

20. A method for permitting control of call routing and billing by sponsors of pay-for-call services in a toll network system having toll switches, a central database computer connected to the toll switches having a routing plan stored therein, the method comprising:

modifying the routing plan by insertion or deletion of an element that causes a call to be routed to a first termination if an Operator Services Position System (OSPS) record, indicating that the call originated through an operator, detected by an originating toll switch of the toll switches is incomplete;

transmitting the OSPS record relating to the call from the originating toll switch to the central database computer;

determining specific instructions for routing the call from the routing plan modified and transmitting the specific instructions to the originating toll switch; and receiving at the originating toll switch the specific instructions and routing the call from the originating toll switch to the first termination when the OSPS record detected by the originating toll switch indicates the call originated through an operator.

21. A telecommunications toll switch system connecting callers with called service sponsors, the telecommunications toll switch system comprising:

toll switches forming a network; and a shared database computer connected to a toll switch of the toll switches, the shared database computer having a database storing routing plans corresponding to the called service sponsors, the routing plans defining a specific route to be implemented by an originating toll switch of the toll switches when a call is received by the originating toll switch, the specific route being one of two alternative routes, the two alternative routes possibly ending at the same destination, the two alternative routes being modifiable by a support system computer connected to the shared database computer through a program running thereon and addressable through at least one of telephone prompting, communication through direct modem connection via a termination, and connection through the Internet, the two alternative routes being defined by a conditional branch point, called a test node, from which stem two alternate branches, each of the two alternate branches corresponding to one of the two alternative routes, the specific route corresponding to the one of the two alternate branches that is connected to an outcome of the test node that satisfies a condition of the test node, and the condition of the test node being determined by a feature of data corresponding to an origin of the call, the data being communicated to the database computer through a query from the originating toll switch to the shared database computer.

22. A telecommunications toll switch system connecting callers with called service sponsors, the telecommunications toll switch system comprising:

toll switches forming a network;

a shared database computer connected to a toll switch of the toll switches, the shared database computer having a database storing routing plans corresponding to a called service sponsor of the called service sponsors; and a billing recorder connected to the toll switch, the billing recorder recording a duration of a call and a rate to be applied to the call on a billing record, the routing plans defining a specific route to be implemented by an originating toll switch of the toll switches when a call is received by the originating toll switch, the specific route being one of two alternative routes, the two alternative routes possibly ending at the same destination, the two alternative routes being modifiable by a support system computer connected to the shared database computer through a program running thereon and addressable through at least one of telephone prompting, communication through direct modem connection via a termination, and connection through the Internet, the two alternative routes being defined by a conditional branch point, called a test node, from which stem two alternate branches, each of the two alternate branches corresponding to one of the two alternative routes, the specific route corresponding to the one of the two alternate branches that is connected to an outcome of the test node that satisfies a condition of the test node, at least one of the two alternate branches having an object, called a rate node, that forces the rate to be applied to the call to be overridden when the one of the two alternate branches is connected to the outcome, whereby the billing recorder records an override rate on the billing record when the condition is satisfied, and the branch point being the test node in which the condition is determined by a parameter indicating an origin of the call from a caller of the callers, the parameter being communicated to the shared database computer through a query from the originating toll switch to the shared database computer.

23. The system of claim 22, wherein the parameter indicates whether the call originated through operator-assistance.

24. The system of claim 22, further comprising:

an announcement system connected to the toll switch, the announcement system having a recording indicating that the rate is to be applied to the call;

a routing plan of the routing plans being such that the one of the two alternative branches defines a first route when the parameter indicates that the call was operator-assisted; and the first route being defined such that the announcement system is controlled to play the recording when the specific route is the first route.

25. The system of claim 22, wherein the parameter indicates whether the call originated from a cellular phone.

26. The system of claim 22, wherein the parameter is an indication of a lack of a caller automatic number identification which identifies a local exchange company of the caller.

27. The system of claim 26, further comprising:
an announcement system connected to the toll switch, the announcement system having a recording indicating that the rate is to be applied to the call; the routing plan being such that the one of the two alternative branches defines a third route when the parameter indicates that the caller automatic number identification is lacking; and
the third route being defined such that the announcement system is controlled to play the recording when the specific route is the third route.

28. The system of claim 26, wherein:
the routing plan is such that the specific route is a third route when the parameter indicates the caller automatic number identification is lacking; and
the third route routes the call through an operator to obtain credit information from the caller.

29. The system of claim 22, wherein the parameter is an indication that the call originated from one of a specified local exchange carrier and a specified area code.

30. A method for controlling a plurality of telecommunications switches, the method comprising:
receiving, at a database computer connected to a telecommunications switch of the plurality of telecommunications switches, call-origin-data defining an origination route of a call to the telecommunications switch;
determining, at the database computer, a selected route responsively to a condition and the call-origin-data; and
transmitting in response thereto the selected route back to the telecommunications switch, wherein transmitting the selected route is responsive to a database of the database computer defining routes through which the call may be routed to a final termination, the selected route being one of the routes, the selected route being selected from among the routes responsively to the condition satisfiable by the call-origin-data,
the call-origin-data includes data indicating that automatic number identification is not provided by a local exchange company from which the call originated, and
the selected route includes an indication that an announcement is to be played by the toll switch when the data indicates that said ANI the automatic number identification is not provided, said message the indication indicating that a surcharge is to be applied to the call.

31. The method of claim 30, wherein the call-origin-data includes data indicating that the call originated through an operator.

32. The method of claim 30, wherein the call-origin-data includes data indicating that the call originated from a cellular phone.

33. The method of claim 30, wherein:
the selected route includes one of a human operator platform and a digit-prompter to obtain information from a caller making the call when the data indicates that said ANI the automatic number identification is not provided.

34. A method for controlling a computer for controlling a plurality of telecommunications switches, the method comprising:
storing, on the computer, routes through which a call may be routed to a final termination, a selected route being one of the routes, the selected route being selected from among the routes responsively to a condition satisfiable by call-origin-data defining a route of the call to an originating switch of the plurality of telecommunications switches;
receiving at the computer the call-origin-data;
determining the selected route responsively to the condition and the call-origin-data, wherein determining the selected route is effective to determine an override rate applicable to the call;
transmitting the selected route to a telecommunications switch; and
controlling an announcement system connected to the telecommunications switch to invoke an announcement indicating a surcharge to be applied to the call responsively to instructions and rate data.

35. The method of claim 34, further comprising controlling a billing record to record data responsive to the rate data.

36. The method of claim 35, further comprising reading the billing record and generating data defining rates for billing for the call.

* * * * *

UNITED STATES PATENT AND TRADEMARK OFFICE
CERTIFICATE OF CORRECTION

| | | |
|---|---|---|
| PATENT NO. | : 8,208,613 B1 | Page 1 of 1 |
| APPLICATION NO. | : 08/991281 | |
| DATED | : June 26, 2012 | |
| INVENTOR(S) | : Michael Anthony Kawecki et al. | |

It is certified that error appears in the above-identified patent and that said Letters Patent is hereby corrected as shown below:

In Claim 18, Column 14, Line 33, after the word "call" please add --,--.

In Claim 18, Column 14, Lines 50-51, please delete "said at least one of said toll switches" after the words "connected to".

In Claim 30, Column 17, Line 42, please delete "said ANI" after the word "that".

In Claim 30, Column 18, Line 1, please delete "said message" after the word "provided,".

In Claim 33, Column 17, Lines 13-14, please delete "said ANI" after the word "that".

Signed and Sealed this
Fourteenth Day of August, 2012

David J. Kappos
*Director of the United States Patent and Trademark Office*

UNITED STATES PATENT AND TRADEMARK OFFICE
CERTIFICATE OF CORRECTION

PATENT NO.         : 8,208,613 B1
APPLICATION NO.    : 08/991281
DATED              : June 26, 2012
INVENTOR(S)        : Michael Anthony Kawecki et al.

Page 1 of 1

It is certified that error appears in the above-identified patent and that said Letters Patent is hereby corrected as shown below:

On the Title Page, Item (73) Assignee: the portion reading "I, LP" should be changed to --II, L.P.-- and should read AT&T Intellectual Property II, L.P.

Signed and Sealed this
Nineteenth Day of March, 2013

Teresa Stanek Rea
*Acting Director of the United States Patent and Trademark Office*